United States Patent [19]

Eberle

[11] 4,341,256
[45] Jul. 27, 1982

[54] METHOD AND APPARATUS FOR FORMING BATTERY STRAPS AND INTERCELL CONNECTIONS

[75] Inventor: William J. Eberle, Reading, Pa.

[73] Assignee: General Battery Corporation, Reading, Pa.

[21] Appl. No.: 173,481

[22] Filed: Jul. 30, 1980

Related U.S. Application Data

[63] Continuation of Ser. No. 752,644, Dec. 20, 1976, Pat. No. 4,241,780.

[51] Int. Cl.³ .................... B22D 19/04; B22D 39/02
[52] U.S. Cl. .................................... 164/109; 164/135; 164/136; 164/334; 164/337; 164/DIG. 1
[58] Field of Search ................... 164/108-112, 164/135, 136, 332-335, 337, 342, DIG. 1; 222/162, 170, 166, 167, 269, 270, 271, 274, 275, 282, 385, 367, 370, 478, 564, 252, 330, 604, 629

[56] References Cited

U.S. PATENT DOCUMENTS

| | | | |
|---|---|---|---|
| 1,882,414 | 10/1932 | Ford | 136/176 |
| 2,327,123 | 8/1943 | Morse | 222/274 X |
| 2,364,615 | 12/1944 | Beckes | 164/337 |
| 2,422,719 | 6/1947 | Eaton | 222/318 X |
| 2,683,294 | 7/1954 | Ennor et al. | 164/335 |
| 3,138,860 | 6/1964 | Meshew | 164/108 X |
| 3,329,315 | 7/1967 | Wilcox | 222/604 X |
| 3,350,237 | 10/1967 | Sealey | 136/176 |
| 3,534,891 | 10/1970 | Bozich | 222/478 |
| 3,579,386 | 5/1971 | Tiegel et al. | 136/176 X |
| 3,616,845 | 11/1971 | Farmer | 164/DIG. 1 |
| 3,674,085 | 7/1972 | Clingenpell et al. | 164/333 |
| 3,815,623 | 6/1974 | Farmer | 137/142 |
| 3,815,659 | 6/1974 | Pavlo et al. | 164/133 X |
| 3,977,460 | 8/1976 | Badone et al. | 164/155 |
| 3,988,169 | 10/1976 | McLean | 164/DIG. 1 |
| 4,086,695 | 5/1978 | Cornette et al. | 164/DIG. 1 |
| 4,144,927 | 3/1979 | Emerton et al. | 164/108 |

FOREIGN PATENT DOCUMENTS

| | | | |
|---|---|---|---|
| 902431 | 1/1954 | Fed. Rep. of Germany | 222/604 |
| 126873 | 5/1919 | United Kingdom | 222/166 |

Primary Examiner—Gus T. Hampilos
Attorney, Agent, or Firm—Benasutti Associates, Ltd.

[57] ABSTRACT

Battery plates are assembled into stacks forming positive and negative rows of lugs and the stacks are placed within the cells in a battery case. Molding channels are automatically formed around the positive and negative rows of lugs and molten lead alloy is automatically introduced into the molding channels to cast the straps and intercell connections simultaneously within the battery case.

17 Claims, 18 Drawing Figures

METHOD AND APPARATUS FOR FORMING BATTERY STRAPS AND INTERCELL CONNECTIONS

This is a continuation of application Ser. No. 752,644, filed Dec. 20, 1976 Now U.S. Pat. No. 4,241,780.

BACKGROUND OF THE INVENTION

I. Field of the Invention

This disclosure relates to a method and apparatus for automatically forming battery straps and intercell connections in a storage battery.

II. Description of the Prior Art

Various techniques exist for forming battery straps and making intercell connections in a battery. See U.S. Pat. Nos. 3,703,589; 3,652,337; 3,579,386; 3,519,489; and 3,514,342.

In U.S. Pat. No. 3,703,589, alternate plates in each compartment of a battery are electrically interconnected by a crossbar. Conductive bar-like members extend upwardly from the crossbars on opposite sides of the compartment partition wall and they are electrically interconnected at their upper ends by conductive pins which extend through an aperture in the partition wall. The conductive bar-like members are cast in molds formed in the battery but the crossbars are not. During the casting process the conductive bar-like members are connected to the conductive pins. However, a further step is required to seal the connection to the partition wall by applying pressure through the bar-like members to opposite ends of the pins.

A cast on method of forming straps to battery plates is described in U.S. Pat. No. 3,652,337. A number of alternatively spaced positive and negative plates with separators therebetween form a cell group which ultimately forms one cell of the finished battery. The lugs of the plates within the cell group form two rows of lugs, a positive row and a negative row. These lugs are cleaned, coated with a lead alloy melt and then rapidly transferred to a plate strap casing station where the lugs are immersed into a mold filled with molten-strap-forming material.

U.S. Pat. Nos. 3,818,985; 3,815,623; 3,565,162; 2,199,598; and 1,336,767 all disclose methods for handling or casting molten metal. Certain of these patents disclose methods for continuous or simultaneous pouring for casting several parts. U.S. Pat. Nos. 3,921,704; 3,371,186, and 2,364,615 disclose means of casting molten metal and minimizing the oxidation thereof during the casting process.

More recently a method of molding connectors in electrical accumulators has been disclosed in U.S. Pat. No. 3,988,169. The assembly method according to that patent "permits placement of the plates into their respective cells prior to their interconnection, and subsequently allows simultaneous interconnection of plates and forming of intercell connectors between adjacent cells which are separated by a partition wall, by flowing molten lead or lead alloy through an aperture in the partition wall between the cells". The method requires the forming of a "channel adjacent the plates of like polarity in each group of plates".

While U.S. Pat. No. 3,988,169 overcomes some of the disadvantages of prior art techniques, this patent discloses a method which is dependant upon the hand manipulation of battery plates and molds within the battery case, with attendant quality control and misalignment problems. Similarly, since polypropylene, a standard battery case material, melts below the temperature of molten lead, the method by which that lead is introduced adjacent and through the plastic aperture is of particular concern. See U.S. Pat. No. 3,874,933 which relates to the casting of lead through a plastic aperture. U.S. Pat. No. 3,988,169 does not describe means for introducing molten lead into the channels described therein nor are the problems relating to the bonding which is obtained between the molten lead and the battery lugs and/or between the lead in adjacent compartments considered by this patent. See U.S. Pat. Nos. 3,652,337; 3,238,579; 3,229,339; 3,087,005; 2,799,905; and 2,454,053 for discussion of various approaches taken to overcome problems encountered when trying to cast straps to the lugs whith a "cast on" method. Temperature gradients within sections which are successively cast would be expected to result in differential hardening and the formation of oxide barriers between different portions of the intercell connection and/or strap. These oxides or dross will substantially increase the internal resistance of the battery or cell, and may encourage corrosion which could, under certain conditions cause premature failure or sparking, the latter of which may have explosive consequences. Use of standard ladling techniques to cast the straps and intercell connections of the battery of U.S. Pat. No. 3,988,169 also present certain fill control and premature hardening problems since the disclosed molding channel is relatively deep and a steady hand would be required to pour a thin, accurate stream of molten lead into the channel without splashing lead against the upper portions of the side walls of the mold.

SUMMARY OF THE INVENTION

The present invention describes an improved apparatus for casting the straps and intercell connections of an electric storage battery. The apparatus is adapted to efficiently handle standard open-topped battery cases having a plurality of cellular partitions therein. Each of the partitions has at least one aperture through which the intercell connections are formed. Stacks of positive and negative plates are initially placed in each of the cells of the batteries, the stacks of plates forming rows of protruding positive and negative lugs extending generally toward the top of the battery case.

Automated mold means are provided to automatically align the plate stacks within the case and to form tapered molding channels around at least a portion of the positive and negative rows of lugs in each of the cells. Molten metal alloy is simultaneously introduced into the various molding channels from a novel ladel means which minimizes the formation of dross and which forms and introduces a plurality of preselected aliquots of molten lead into various preselected points along the molding channels. The molten lead flows into the channels and through the apertures in the partition thereby forming tapered, homogeneous battery straps and integral intercell connections while minimizing the amount of lead required to form a finished product.

Accordingly, it is an object of this invention to provide an apparatus for automatically forming electrically homogeneous battery straps and intercell connections within the battery case.

It is a further object of this invention to cast dross-free straps and intercell connections having tapered configurations.

A further object of this invention is the provision of an apparatus for forming tapered molds within the battery case around the rows of positive and negative lugs of the stacks of plates within the battery.

Another object of this invention is the provision of an apparatus adopted to position the battery and align the plates within the battery prior to and during the introduction of the molding channels therearound.

Another object of this invention is the provision of an apparatus for forming and delivering preselected aliquots of molten lead to a plurality of lead battery part molds for simultaneous casting in the molds as, for example, the simultaneous casting of battery straps and intercell connections within the battery casing.

These and other objects of my invention will become apparent from the following description with reference to the accompanying drawings.

BRIEF DESCRIPTION OF THE DRAWINGS

FIG. 14, a-d, are diagramatic cross-sections of the preferred embodiment ladle in various stages of rotation from the standby position shown in FIG. 14a to the full pouring position as shown in FIG. 14d;

DETAILED DESCRIPTION OF THE DRAWINGS

Although specific forms of the invention have been selected for illustration in the drawings, and the following description if drawn in specific terms for the purpose of describing these forms of the invention, this description is not intended to limit the scope of the invention which is defined in the appended claims.

The preferred embodiment apparatus for casting the straps and intercell connections of a lead acid storage battery is illustrated in the drawings. Briefly, this apparatus operates as follows: open topped battery cases which have been prepunched with apertures for intercell connections are preloaded with stacks of battery plates and separators. These battery cases are then moved along a work surface to a processing position whereupon the case is moved relative to a mold means which aligns the plates of the battery within the case for subsequent processing. The comb and back dams of the mold means are then moved relative to each other to form molding channels around the rows of positive and negative plate lugs of the stacks within the battery case. Preferably, the channels formed by the molds have a unique tapered shape such that the depth of each channel is greatest at the point adjacent the intercell connection to be formed between adjacent battery cells. This shape adds structural integrity to the channels and provides greater electrical conductivity at the point of intercell connection where the current flow is greatest. During the aforementioned processing steps, a continuously circulating lead delivery system has established an equilibrium temperature within a novel ladle means which is normally closed to the atmosphere to prevent oxidation of the molten lead. Once the molding channels have been established, the ladle is activated, at which time circulation of the lead is momentary interrupted and that portion of the lead stream which is isolated within the ladle is then divided by the ladle into a plurality of preselected aliquots of molten lead. Movement of the ladle from the standby to the casting position further produces movement of the ladle spouts to the pouring position, whereupon the aforementioned aliquots of molten lead are simultaneously delivered into the molding channel in the appropriate amounts and within the desired temperature ranges to insure the formation of a substantially homogeneous dross free integral strap-intercell connector assembly. At the completion of this pouring cycle, the ladle is immediately returned to the standby position to reestablish the continuous lead circulation therethrough and, following solidification, the comb and back dam portions of the apparatus are automatically retracted. The battery case is then withdrawn relative to the mold means, whereupon the cycle is complete and the apparatus is ready to receive the next battery case for processing.

Figure 1:
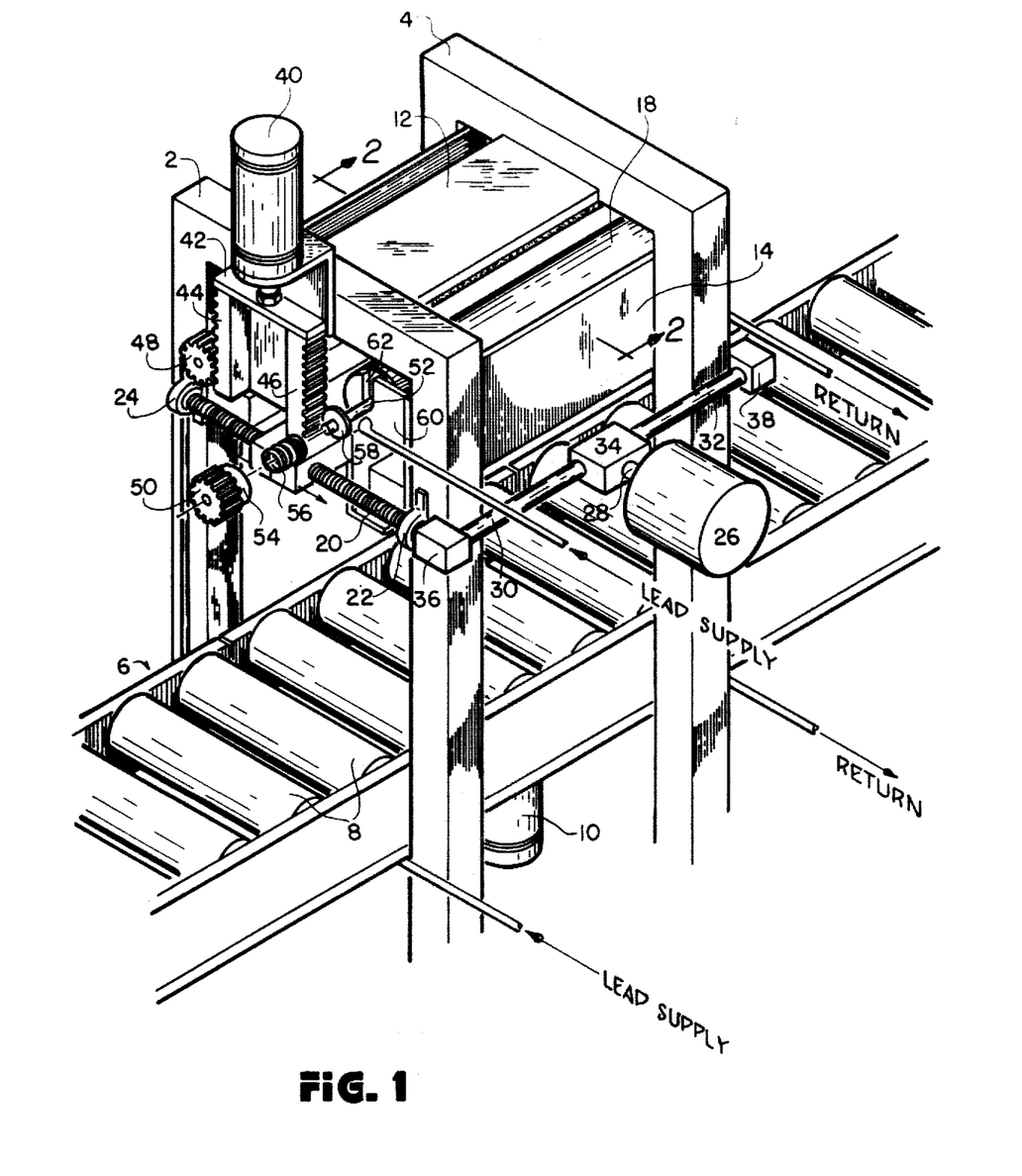
FIG. 1 is an isometric view of a cast-in battery making apparatus in accordance with a preferred embodiment of the present invention.

In FIG. 1, an embodiment of an apparatus for forming the battery straps and intercell connections and molding the terminal post into the battery straps is shown having a processing position over a work surface for receiving the unprocessed battery case and stacks. Frame supports 2 and 4 position the apparatus above the work surface designated generally 6. The remaining frame details consist of a closure pad support and housing 12 running between frames 2 and 4; the surfaces of the frame are made up of side mounting plates 14 and 16 and top 18. The side and top surfaces are made out of conventional materials, such as sheet metal.

To faciliate movement of the batteries along the work surface, cylinderial rollers 8 are utilized, the axes of the rollers being transverse to the direction of movement of the batteries. A portion of the roller assembly is capable of movement in an upward direction driven by an elevating means such as the cylinder 10 located beneath the work surface. This acts to position the battery properly in elevation for processing by the apparatus.

Figure 2:
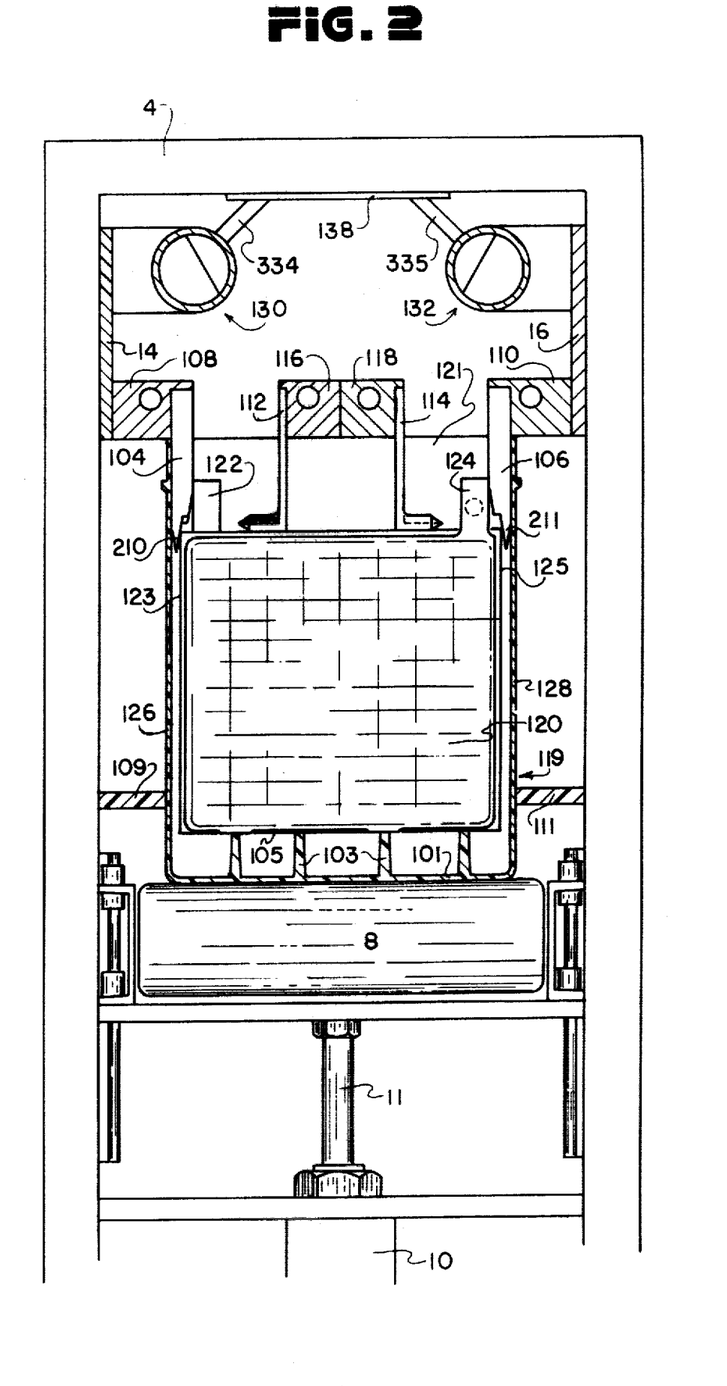
FIG. 2 is an enlarged cross section of the embodiment of FIG. 1 showing the ladles and molds in standby positions, taken as indicated by the lines and arrows 2—2 in FIG. 1.
Figure 3:
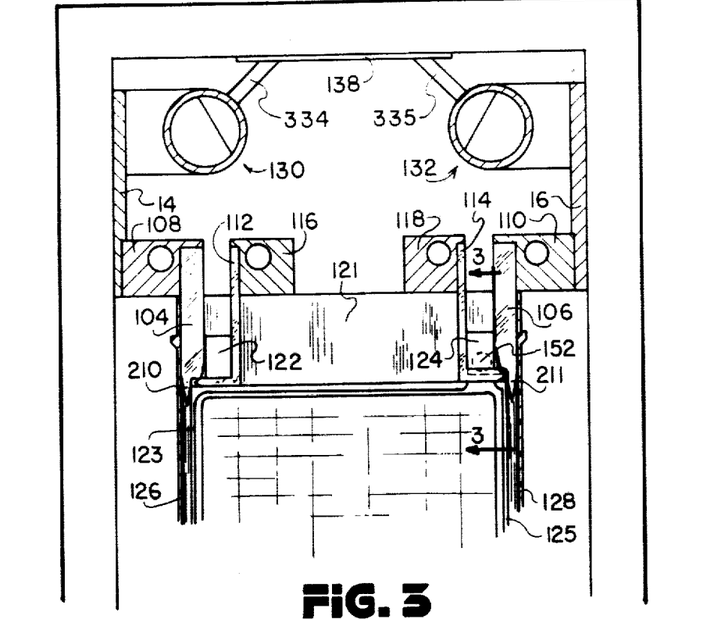
FIG. 3 is a cross section of a portion of the device as illustrated in FIG. 2 wherein the molds have been moved to the closed position.
Figure 4:
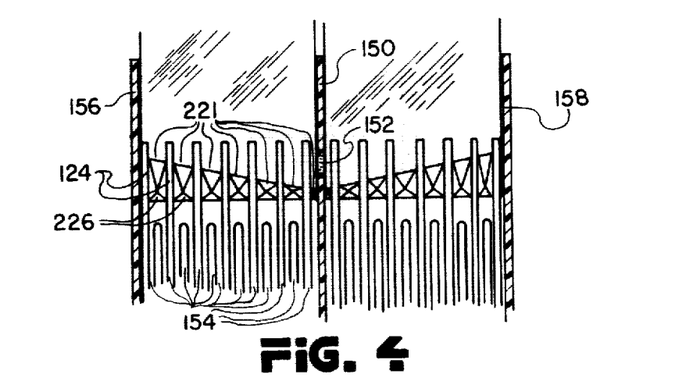
FIG. 4 is a cross section of a portion of the apparatus illustrated in FIG. 3 taken as indicated by the lines and arrows 3—3 in FIG. 3.

Referring to FIG. 2, a cross-section of an open-topped battery case designated generally 119 is shown in position for processing. The bottom of the battery case 101 is shown resting on a series of rollers 8 of the work surface 6. Floor supports 103 of the battery support the inner floor 105 of the battery on which the battery plates rest. Individual plate 120 is shown as one of many positive and negative plates present in the battery. Each plate has an upwardly protruding portion called a lug. The lug 124 of plate 120 and the lug 122 of the adjacent plate behind plate 120 are shown on opposite sides of the battery. The outer casing walls of the battery are indicated by 126 and 128. A cellular partition of the battery which extends to the top of the battery case, is represented in FIGS. 2-4 as 121.

The entire battery 119 and a portion of the work surface below the apparatus upon which the battery rests are automatically elevated to a position proximate to the mold dams of the apparatus by cylinder 10. In FIG. 2, the battery is shown in the elevated position with piston rod 11 shown extended. In this embodiment the battery positioners 109 and 111 attached to the apparatus align the battery in the work surface for operation by the apparatus.

FIG. 2 also shows the molds in standby position above the battery. Two of several back dam mold portions 104 and 106 are shown connected to back dam support members 108 and 110. The back dam support members 108 and 110 are connected in any suitable manner to the mounting plates 14 and 16. Two of several comb dam portions of the mold are designated 112 and 114. The comb dams are also mounted to comb dam support members 116 and 118.

Since the comb dams must move to engage the back dams, the comb dam support members are mounted on a worm drive designated 20 in FIG. 1. The worm drive turns in bushing supports 22 and 24 shown mounted to frame 2. A similar worm drive assembly exists attached to frame 4 but not shown in FIG. 1. To move the comb dams, air motor 26 is turned, which turns shaft 28, and rotation of shaft 28 is converted into rotation of rods 30 and 32 through dual bevel gear conversion box 34. Rotation of rod 30 is converted into rotation of worm drive 20 through bevel gear conversion box 36. Similarly, rotation of rod 32 will result in rotation of the remaining drive through bevel gear conversion box 38. Driving the motor in one direction will move the comb dams to engage the back dam portions of the mold at which time the motor will stall, and driving of the motor in the other direction will serve to disengage the comb dams from contact with the back dams.

Figure 8:
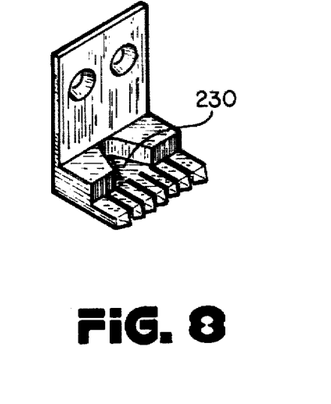
FIG. 8 is an isometric view of a negative post comb dam.
Figure 9:
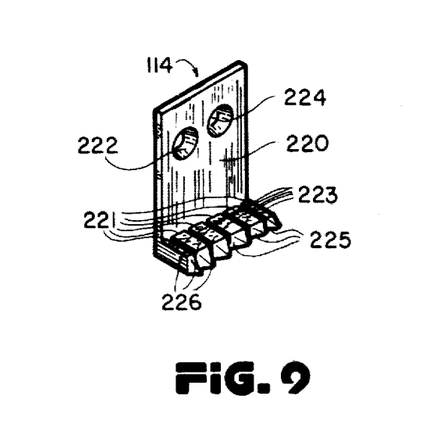
FIG. 9 is an isometric view of a comb dam.
Figure 10:
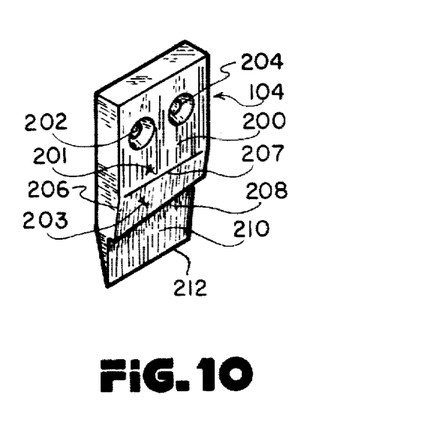
FIG. 10 is an isometric view of a back dam.

FIGS. 7 through 10 show details of a preferred embodiment of the dam portions of the mold. In FIG. 10 a back dam 104 is shown. The back dam is comprised of a substantailly vertical member which is the upper block section 200. Holes 202 and 204 are used to support the vertical back dam against the back dam support member. The lower region of the upper block portion 200 is tapered along line 206 from break 207 to edge 208. Also the height of the upper block member 200 is tapered along the bottom edge 208 of the upper block member 200. The back dam is further comprised of a tapered section 210 lowermost in the back dam, said tapered section forming a knife-like edge 212. The purpose of the knife-like edge 212 is for guiding the plates of the battery into position for the movement of said comb dams. The tapered section 210 slides between the battery case wall 126 in FIG. 2 and the vertical edges 123 of the battery plates. This interposition of the back dam tapered sections 210 and 211 between the battery casing walls 126 and 128 and the vertical edges of the battery plates 123 and 125 aligns the lugs of the plates for subsequent processing. In the absence of battery positioners 109 and 111, as in an alternate embodiment of this invention, the interposition of the back dams in the way just described will act to adjust the position of the battery on the work surface at the same time.

In FIG. 9, an embodiment of a comb dam is illustrated. The comb dams are moved across the tops of the battery plate surfaces to engage the back dams. The comb dam 114 is comprised of a vertical member 220 with support holes as in the back dam section designated 222 and 224. The comb dam further comprises a plurality of horizontal members 226 that are parallel spaced apart. In the embodiment described herein the horizontal members 226 intersect the vertical member 220 along a sloping line represented by 221 in FIG. 9. As a comb dam 114 moves across the battery plates to engage a back dam 104, the horizontal members 226 interpose themeselves between the battery plate lugs, the plates slipping between the horizontal members in the grooves or slots 223. Once the comb dam 114 has moved into position, a mold cavity is formed between the vertical surfaces of the back dams and the comb dams and the horizontal portions of the comb dams.

Figure 7:
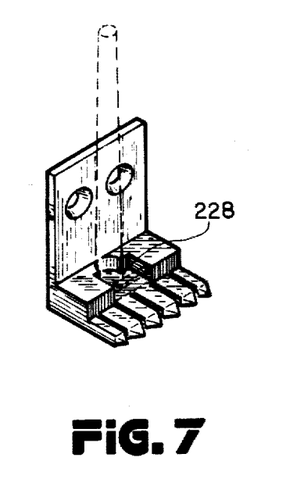
FIG. 7 is an isometric view of a positive post comb dam.

FIGS. 7 and 8, show two post comb dam embodiments which are similar to comb dam 114 except for the depressions 228 in FIG. 7 and 230 in FIG. 8. When the molten lead is about to be poured into the mold section formed by the various dam members, the positive and negative terminal post of the battery are placed into these depressions 228 and 230 in the post comb dams. A terminal post is shown in phantom in the depression 228 of FIG. 7. Then as the molten lead is introduced into the mold and solidifies, the terminal posts are molded into position in the strap assemblies.

Figure 11:
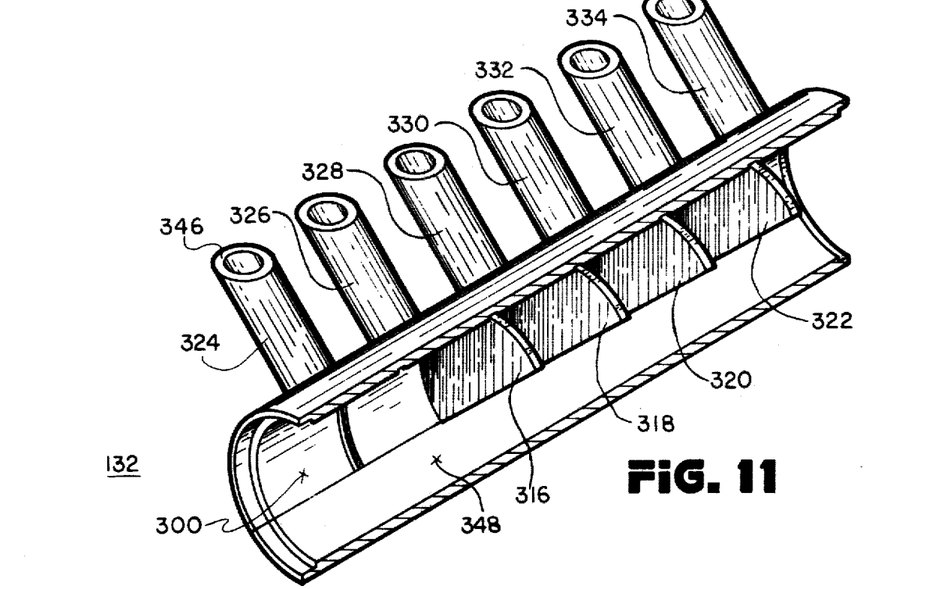
FIG. 11 is an isometric cross-section of a portion of the preferred embodiment ladle of the present invention.
Figure 12:
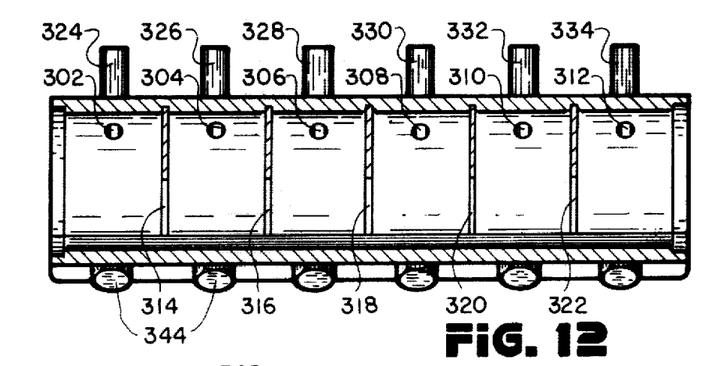
FIG. 12 is a front elevational view of the bisected portion of the ladle illustrated in FIG. 11.
Figure 13:
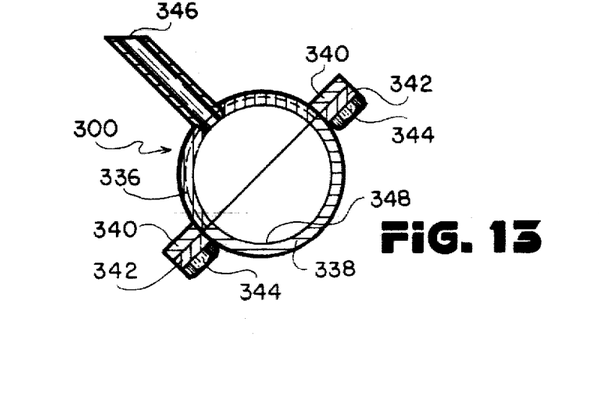
FIG. 13 is a cross-section of the preferred embodiment ladle taken through a spout.

Referring now to FIGS. 11 through 13, a ladle designated generally 132 for casting a plurality of lead battery parts simultaneously is shown. In this preferred embodiment, the ladle comprises several parts. The main body member of the ladle chamber is shown as a circular tube 300. Through the wall of the tube 300 there is placed a plurality of spaced apart holes which are delivery orifices 302, 304, 306, 308, 310, and 312. A series of partitions 314, 316, 318, 320, and 322 are placed transverse to the axis of the tube between the delivery orifices and running partially across the cross-section of the tube 300. As in this embodiment, the partitions 314 through 322 are held in place within the tube by insertion in slots which are places in the tubular wall. The delivery orifices open into a plurality of parallel spaced apart spouts 324, 326, 328, 330, 332, and 334. One method of assembling the ladle is shown in FIG. 13. Two semicircular tubular members 336 and 338 are each equipped with a plurality of lips attached adjoining the edges of the members on either side. One set of lips 342 on member 338 have holes therethrough which align with threaded holes in the lips 340 on member 336. Threaded bolts 334 can be placed through the holes in the lips 342 and screwed into the threaded lips 340 on member 336 thereby forming the ladle tube. The partial partitions 314 through 322 which are transverse to the axes of tubular member 336 are placed in slots in the walls of tubular member 336. These partitions extend across half of the cross-section of tubular member 336. The spouts 324 through 334 are threaded at one end and screwed into threaded holes which exist in the walls of the tubular member 336. It can be seen from FIG. 13 that each of the spouts has a tapered edge 346.

In the apparatus the ladle is rotatable between a standby position and a pouring position. Please refer once again to FIG. 1, where the piston rod (not shown) of cylinder 40 is shown attached to a coupler arm 42 which engages the ends of drive members 44 and 46. Drive members 44 and 46 are grooved on the outside surfaces so as to present a series of parallel spaced apart teeth for engagement with circular drive members 48 and 50 which are also grooved on their perimeters. The teeth on the perimeters of gears 48 and 50 are disposed to engage the teeth on the linear drive members 44 and 46. Connected to the ends of the ladles 132 and 133 are rods, one of which is shown as 52 in FIG. 1. These rods are attached to either end of each of the ladles, the axis of the rods being coaxial with the axis of the ladles. The rods 52 engage gears 48 and 50 forming a firm connection therebetween. Disposed intermediate the drive rod and the end plates of the ladles are a washer 54, a biasing means or spring 56, another washer 58 and ladle support bracket 60 in FIG. 1. At each end of each ladle there exists a ladle support bracket such as 60 which contains therein a groove 62 into which the rods 52 rest. These ladle support plates not only provide a means for support for the ladles but also allow the ladles to rotate above the work surface. Hence when cylinder 40 is activated, the cylinder piston rod drives the coupler arm 42 in a downward direction thereby moving the vertical drive members in a downward direction said drive members engaging the gears to rotate the rods connected to the circular drive members. When the rods rotate, they rotate the ladles.

Figure 15:
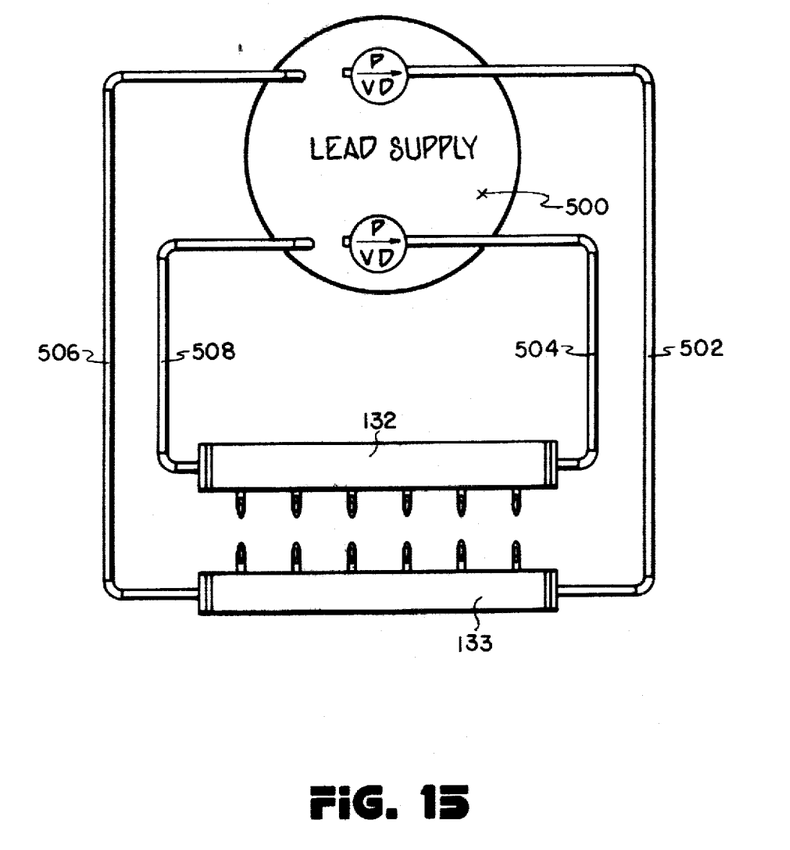
FIG. 15 is a schematic of the preferred embodiment molten lead supply system shown in combination with the preferred embodiment ladles of the present invention.

The molten lead is delivered to the ladles, as shown in a schematic of the lead supply system is illustrated in FIG. 15. A reservoir designated generally 500 contains molten lead which is pumped through supply lines designated 502 and 504 into the ladles 132 and 133 and out through the return line 506 and 508 back to the reservoir 500. The temperature of the molten lead in the reservoir can be controlled to insure that the lead remains molten throughout the system. In the standby position, molten lead flows through the ladle chamber 300 of FIG. 11 unimpeded along the inside surface portion designated 348. The spouts, as shown by spouts 334 and 335 in FIG. 2, are pressed against the closure pad 138. This insures that in the standby position while the molten lead is circulating through the ladles no dross can form since no portion of the system is open to the atmosphere. As the ladle begins to rotate, the partial partition 314 through 332 shown in FIGS. 11 and 12 divide the molten lead contained within the ladle into preselected aliquots. For example, the ladle shown in FIG. 11 has six spouts and six partitioned compartments within the chamber for delivering measured portions of molten lead of each of the channels formed by the molds within each of the six cells in the battery. There are two such ladles in the apparatus located for pouring such portions of molten lead into the channels formed around two rows of battery lugs. When the ladle has rotated sufficiently far so that the molten lead now covers over the delivery orifices 302 through 312, the molten lead will then begin to pour from the ladle through the spouts 324 through 334.

Figure 14A:
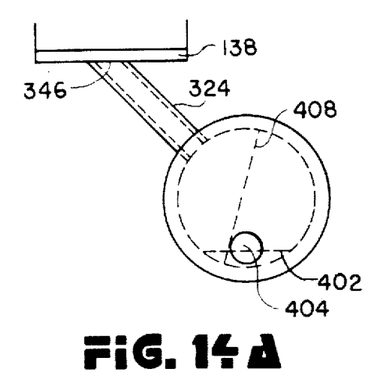
Figure 14B:
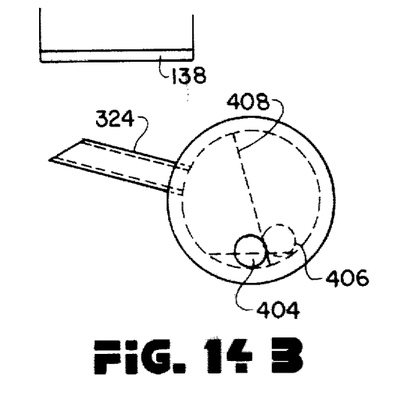
Figure 14C:
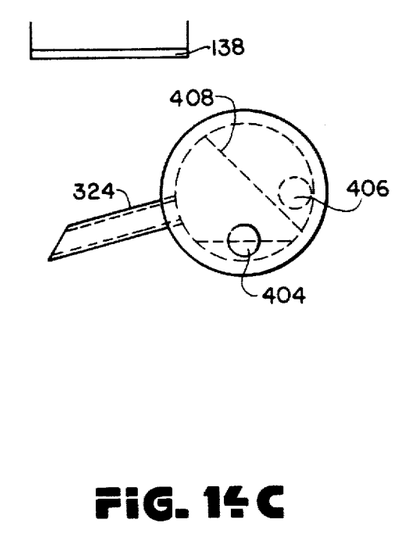
Figure 14D:
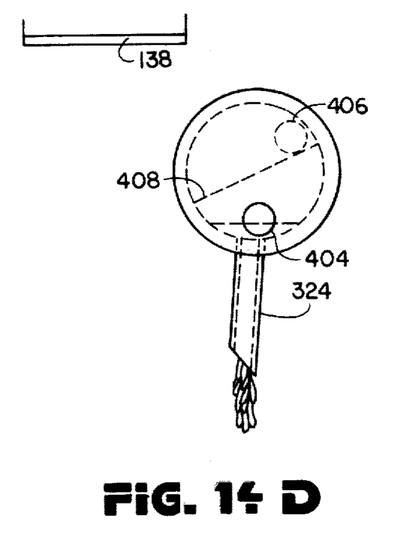

In FIG. 14a, the ladle is illustrated in the standby position with the spout 324 pressed against the closure pad 138 along the tapered edge 346 of the spout. The dashed line 402 in FIG. 14a, shows the level of molten lead as it flows through the the ladle in the standby position. The molten lead enters into the ladle chamber through the opening 404 in the ladle support plate 60 shown as the solid circle in FIGS. 14a-d and the hole 406 in the ladle end shown as a dotted circle in FIGS. 14a-d. A corresponding pair of holes exists in the opposite end of the ladle and ladle support plate. A supply line is connected to the opening 404 in which molten lead is introduced into the ladle chamber. As the ladle begins to rotate, as in FIG. 14b, the spout 324 leaves the closure pad 138 and the opening 406 in the end of the ladle chamber moves away from the opening 404 in the ladle support plate 60 describing a circular path and thereby cutting off the supply of molten lead to the inside of the ladle. The phantom lines 408 in FIGS. 14a-d, represents the rotation of the partitions 314-322. In FIG. 14c, the partition has intercepted the level of molten lead residing in the chamber thereby beginning to divide the puddle of molten lead within the ladle into sections for pouring. By the time the spout has rotated around as shown in FIG. 14d, the molten lead has been segmented into the various compartments within the ladle and the lead begins to pour from the ladle through the delivering orifices 302-312 and spouts 324 through 334 into each of the channels formed by the molds in the battery.

FIGS. 2 through 6, show the positions of the various components of the apparatus at different stages during the casting process. FIG. 2 shows the apparatus in a standby position with the battery in place. The comb dam portion designated generally 112 and 114 have not yet begun to move and interpose themselves among the battery plates and engage the back dam sections designated generally 104 and 106. The ladle members designated generally 130 and 132 have not yet begun to rotate and spouts 334 and 335 are still pressed against closure pad 138.

In FIG. 3, the comb dam portions of the mold have engaged the back cams and interposed themselves among the battery plates. The ladle spouts have not yet begun to rotate.

Two adjacent cells in the battery are shown in FIG. 4 formed by the partitions 150, 156, and 158. The spaces within each cell communicate with one another through the aperture 152 in partition 150. The plates 154 which form the stacks in each of the cells are shown as viewed from the edge of the plates. The lugs of alternate plates are labeled 124 and are shown interposed with the horizontal portions 226 of the comb dam. The upper surfaces of the horizontal portions 226 of the comb dam in the cell formed by partitions 156 and 150 slopes generally downward from left to right while the upper surfaces of the horizontal portions of the comb dam in the cell formed by partitions 158 and 150 slopes generally downward from right to left.

Figure 5:
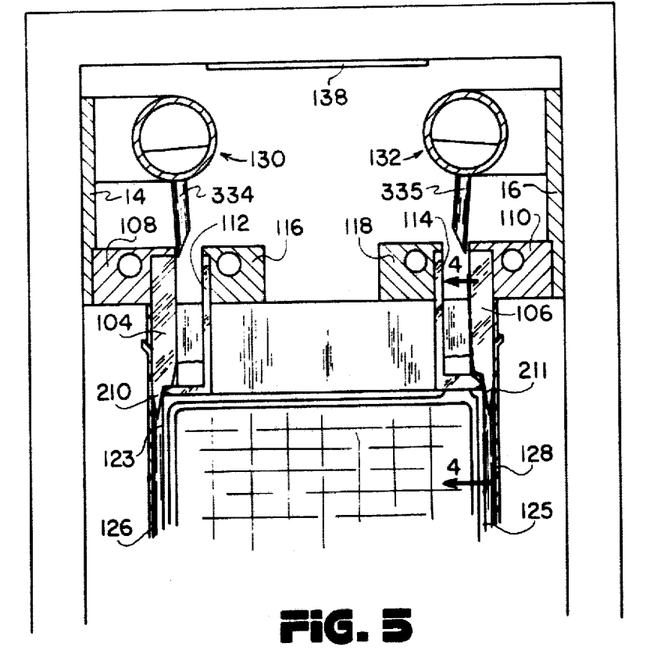
FIG. 5 is a cross section similar to FIG. 3 showing the molds in the closed position and the ladles in the pouring position.
Figure 6:
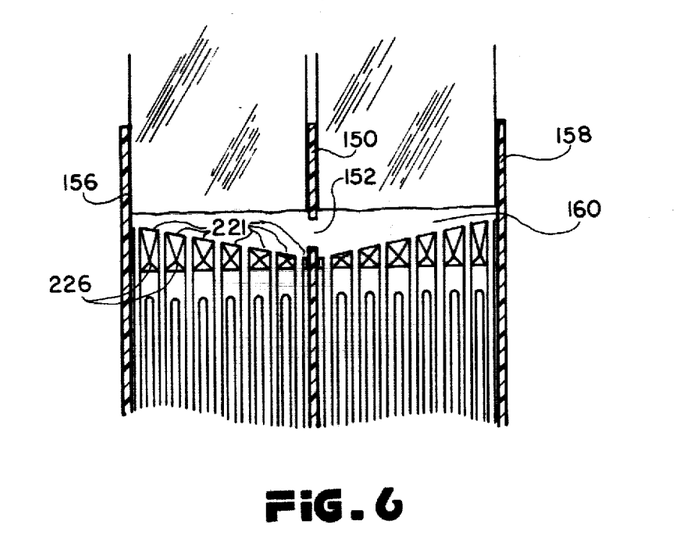
FIG. 6 is a cross section similar to FIG. 4 showing the lead straps and one intercell connection after pouring.

In FIG. 5, the molds are formed as in FIG. 3 and the ladles have rotated into the pour position. The inside surfaces 201 and 203 shown in FIG. 10 of back dams 104, the inside surface of vertical member 220 of comb dam 114, the top surfaces of the horizontal portions 226 of comb dams 114, the plate lugs interposed in grooves 223 of FIG. 10, and the side surfaces of the battery partitions 156 and 150 have come together to form the surfaces of a single mold channel. Two such channels are shown in FIG. 6 connected through the opening 152 in partition 150. The tips 225 of the horizontal members of the comb dam slip under the edge 208 of the back dam thereby forming a seal between the comb dam and the back dam along a sloping or tapered intersection. It will be seen that the slope 221 of the horizontal members of a comb dam mate with a slope 208 of the corresponding back dam forming this seal.

FIG. 6 is a view along the lines and arrows 4-4 in FIG. 5 showing a cross-section of the strap and intercell connection 160. The molten lead was introduced into the adjacent channels formed by the molds by two of the spouts of one of the ladles. The molten lead flows together through the intercell opening 152 in partition 150 and forms a single casting 160. The depth of the casting is greatest at the intercell connection and tapers to a shorter depth at either end of the casting near the partitions 156 and 158. This greater mass of metal at the intercell connection lowers the electrical internal resistance of the battery by providing a greater mass of metal at the point of highest current flow in the battery. This greater depth of the casting throughout a portion of the casting length from partition 156 to partition 158 adds to the structural integrity of the overall strap configuration in the battery.

Referring again to FIG. 5, the spouts 334 and 335 have rotated around and the tapered edge of the spouts enters into the top opening of the channel formed by the vertical members of the back dam and comb dam. The long vertical lengths of the channels formed by the back dam and comb dam portions of the mold and the long spout connected to the ladle provide a sure path for the molten lead to follow in leaving the ladle and entering the mold thereby insuring that all of the molten lead will enter the desired channel within the battery and splashing of the molten lead will be minimized. By simultaneously introducing molten lead into each individual channel formed within the battery in the way just described, a homogeneous strap is formed and reliable intercell connections are cast. FIGS. 5 and 6 show that the battery lugs have been melted down as a result of being immersed in the molten lead. The temperature of the molten lead introduced into the channels required to melt and mix with the lead of the lugs can be controlled by controlling the temperature of the molten lead in the reservoir.

The partitions, which are present in the battery separating the stacks in the battery into battery cells, already have apertures punched in them, said apertures shown by the dotted circle 152 within the rows of battery lugs in FIGS. 2 and 3, and said apertures being far enough below the top of the partitions to be beneath the electrolyte level when electrolyte is introduced into the battery later on in the battery assembly process. The back dam portions of comb dam portions of the mold which are present in each partition of the battery, cooperate with the partition to form seals. The horizontal portions 226 of the comb dam members are below the partition apertures 152 so that when molten lead is simultaneously introduced into mold channels on either side of a partition, molten lead will flow through the aperture thereby forming an intercell connection. See FIG. 6. These intercell connections are made beneath electrolyte level thereby preventing undue hazard due to sparks and the action of the molten lead as it solidifies tends to create an excellent seal for the intercell connection. This method of forming the straps and intercell connections gives the shortest possible electrical path; minimizes internal electrical resistance; requires the minimum amount of lead; works equally well in poly or rubber battery cases, and eliminates the burning operation on groups or the necessity of cast on equipment when forming battery straps and intercell connections.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent and Trademark Office, and is not intended to limit the scope of the invention described and claimed herein.

What is claimed is:

1. A method for automatically casting the commoning straps and intercell connections of a storage battery, said method comprising the steps of:
   (a) providing a work surface for receiving a battery case, each cell of said battery case containing stacked positive and negative plates;
   (b) providing a battery case having at least two cells defined therein and separated by a cellular partition each cell of said battery case containing stacked positive and negative plates, each of said plates having protruding lugs thereon;
   (c) forming mold means around the protruding lugs of said positive and negative plates within said battery case, said mold means comprising respective molding channels for said positive and said negative protruding lugs;
   (d) providing molten lead from a reservoir having an outlet means for dispensing molten lead and a return means for receiving molten metal;
   (e) providing casting means operatively connected to said outlet means and said return means for circulating said lead through said casting means;
   (f) measuring aliquot portions of lead in said casting means;
   (g) pouring said aliquot portions simultaneously into respective molding channels to cast said straps and intercell connectors.

2. In a method for automatically casting the commoning straps and intercell connections of a lead acid storage battery, said battery comprising a case, said case having a plurality of partitions defining a plurality of cells therein, each of said partitions having at least one aperture defined therein through which said intercell connections are formed, each of said cells containing a stack of interleaved insulating positive and negative plates, with each plate having an upstanding protruding lug on a top edge thereof, said plates being arranged so that all of the positive lugs within a stack lie along one side of the case and all of the negative plate lugs lie along a second, opposite side thereof, all of said lugs extending generally towards the top of said battery case, wherein said casting method comprises the steps of providing at least one open-topped battery case, placing a plate stack in each of said cells, forming an open mold around at least a portion of said positive and negative lugs in each stack and pouring molten lead into said mold to cast a strap and intercell connection, the improvement comprising:
   (a) providing molten lead from a reservoir having an outlet means for dispensing molten lead and a return means for receiving molten lead;

(b) providing casting means operatively connected to said outlet means and said return means for circulating said lead through said casting means;

(c) circulating lead through said casting means;

(d) forming a plurality of premeasured aliquot portions of molten lead in said casting means, the number of said portions being equal to the number of straps being cast, each portion being equal to the volume of lead required to cast a strap and intercell connection in one of said molds; and (e) simultaneously pouring all of said aliquot portions of molten lead, one into each of said molds to cast straps and intercell connections of said battery.

3. The method of claim 2 wherein each of said molds is tapered uniformly towards said portions.

4. The method of claim 2 wherein the step of pouring said plurality of aliquot portions of molten lead into said molds comprises:

(a) introducing molten lead from an external reservoir into a lead circulation system comprising a ladle having an elongated, inner chamber, said ladle being movable between standby and pouring positions and further comprising a plurality of delivery orifices, one for each mold to be supplied, said orifices having pouring spouts affixed thereto to conduct said molten lead to said molds;

(b) isolating the individual aliquot portions of molten lead within said inner chamber; and (c) delivering said individual aliquot portions into said molds through said delivery orifices and pouring spouts after said ladle chamber has been moved from the standby to the pouring position.

5. The method of claim 4 further including the step of circulating molten lead to establish an equilibrium temperature thereof when said chamber is in the standby position, wherein said step comprises:

(a) continuously draining a portion of molten lead from said ladle from an outlet orifice in one end of said elongated chamber;

(b) returning said portion of drained lead to a reservoir for reheating; and (c) pumping a portion of reheated lead equal to said drained portion from said reservoir back into said ladle through an inlet orifice located in the opposite end of said elongated chamber said inlet and outlet being at a level so that sufficient lead for all of said aliquot portions is pumped into said ladle, said pumping causing said lead to circulate through said inner chamber when said ladle is in the standby position.

6. The method of claim 4 wherein said ladle is a horizontally disposed cylinder and said movement between said standby and pouring positions comprises rotating said cylinder around its transverse axis.

7. The method of claim 4 wherein the lead circulation system is divided into a first ladle along one side and a second ladle along the other side of said case, said ladles being disposed over said lug arrays and adapted to cooperate so as to move into said pouring positions substantially simultaneously to form all of said straps and intercell connectors at one time.

8. The method of claim 4 wherein said isolated aliquot portions are formed by:

(a) dividing said inner chamber by a plurality of transverse internal, partial partitions which act to form a set of compartments, each adapted to premeasure and hold one of said aliquot portions, said internal partitions being disposed within said elongated cylinder so that they are above the level of the circulating lead when said ladle is in the standby position so that said lead circulation is unimpeded; and (b) positioning said delivery orifice within each compartment at a point so that when said ladle is in the pouring position, said delivery orifice will be located in its bottommost portion so that said molten lead will drain out completely.

9. The method of claim 8 wherein the steps of isolating and pouring said aliquot portions further comprise:

(a) moving said ladle toward said pouring position from said standby position, said movement acting to disconnect said ladle from said reservoir and to cause said partial partitions to fall below the level of the lead within said ladle, said movement further acting to trap and isolate a premeasured aliquot portion of lead within each of said internal compartments; and (b) continuing movement of said ladle into said pouring position whereby said pouring spouts are disposed directly over the molds being filled so that said lead will completely drain out of said compartment into said molds to form said straps and intercell connectors.

10. The method of claim 9 further including the step of reversing the movement of said ladle after said aliquot portions have drained out, said reversal causing said laddle to return to said standby position and reestablish contact with said reservoir so that an additional quantity of lead may be introduced and circulated therethrough.

11. The method of claim 10 further including the steps of disassembling said molds and removing them from said battery so that said battery may proceed to further processing.

12. A method of automatically casting the straps and intercell connections of a lead acid electric storage battery, said battery comprising a case, said case having a plurality of partitions defining a plurality of cells therein, each of said partitions having at least one aperture defined therein through which said intercell connections are formed, each cell containing a stack of interleaved positive and negative plates, each plate being insulated from each other and having an upstanding protruding lug on the top edge thereof, said plates being arranged so that all of the positive lugs within a stack lie along one side of the case and all of the negative plate lugs lie along a second, opposite side thereof, all of said lugs extending generally towards the top of said battery case, wherein said casting method comprises the steps of:

(a) providing at least one open-topped battery case;

(b) placing a plate stack in each of said cells;

(c) aligning the plates of each stack to position each of said lugs so as to be substantially coaxial with said apertures;

(d) forming an open mold around at least a portion of said positive and negative rows in each stack so that in each of said cells said mold communicates through one of said apertures with an adjacent one of said molds, said molds being formed by mold means which selectively define said mold, said mold means comprising a plurality of dams for forming the surfaces of said mold with at least one dam being movable in relation to the remaining dams to align said lugs;

(e) providing molten lead from a reservoir having an outlet means for dispensing molten lead and a return means for receiving molten lead;

(f) providing casting means operatively connected to said outlet means and return means for circulating said lead through said casting means;

(g) circulating lead through said casting means;

(h) forming a plurality of premeasured aliquot portions of molten lead in said casting means, said plurality being equal to the number of straps being cast, said aliquot portions being equal to the volume of lead required to cast said strap and intercell connection in one of said molds; and (i) simultaneously pouring said aliquot portions molten lead, one into each of said mold to cast the straps and intercell connections of said battery.

13. A method of automatically casting the straps and intercell connections of a multi-celled electric storage battery, said battery comprising a case having a plurality of cellular partitions defining said cells disposed therein, each of said cellular partitions having at least one aperture defined therein through which said intercell connections are formed, each cell containing a stack of interleaved, positive and negative plates, each plate being insulated from those on either side and having an upstanding protruding lug on the top edge thereof, said plates being arranged so that all of the positive lugs within a stack lie along one side of the case and all of the negative plate lugs lie along a second, opposite side thereof, all of said lugs extending generally towards the top of said battery case, wherein said casting method comprises the steps of:

(a) providing at least one open-topped battery case;

(b) placing a plate stack in each of said cells;

(c) aligning the plates of each stack to position each of said lugs substantially coaxially within said apertures;

(d) forming an open mold around at least a portion of said positive and negative rows in each stack so that in each of said cells said mold communicates through one of said apertures with an adjacent one of said molds;

(e) providing molding lead from a reservoir having an outlet means for dispensing molten lead and a return means for receiving molten lead;

(f) providing casting means operatively connected to said outlet means and return means for circulating said lead through said casting means;

(g) circulating lead through said casting means;

(h) forming a plurality of premeasured aliquot portions of molten lead in said casting means, said plurality being equal to the number of straps being cast, each portion being equal to the volume of lead required to cast said strap and intercell connection in one of said molds; and (i) simultaneously pouring all of said aliquot portions of molten lead, one into each of said molds to cast the straps and intercell connections of said battery.

14. A method of automatically casting the straps and intercell connections of a lead storage battery having a plurality of cells, said cells being defined by at least one partition within an open topped battery case, said method comprising the steps of:

(a) providing at least one open-topped case for forming said battery;

(b) placing a stack of interleaved battery plates into each of said cells, each of said plates having an upstanding lug;

(c) aligning the plates of each stack to position said lugs into an array having end portions which are substantially coaxial with an aperture defined in at least one partition;

(d) forming an open mold having a plurality of mold cavities around at least a portion of said lug arrays in each stack, each of said mold cavities being adapted to communicate through said aperture with an adjacent one of said mold cavities;

(e) providing molten lead from a reservoir having an outlet means for dispensing molten lead and a return means for receiving molten lead;

(f) providing casting means operatively connected to said outlet means and return means for circulating said lead through said casting means;

(g) circulating lead through said casting means;

(h) forming a plurality of premeasured aliquot portions of molten lead in said casting means; and (i) simultaneously pouring said aliquot portions of molten lead, one into each of said molding channels to cast the battery straps and intercell connections of said battery.

15. The method of claim 14 wherein said plate stack is formed by interleaving a plurality of positive and negative battery plates, said plates being insulated from each other.

16. The method of claim 14 wherein said step of forming said open mold comprises providing a mold means having a plurality of dams forming the sides and bottom of said open mold with at least one dam being movable in relation to the remaining dams said movable dam acting to align said lugs within said mold.

17. The method of claim 16 wherein said intercell connector is formed by adapting said mold means in one cell to fit over said aperture so that said communication is with a mold cavity on the other side of said partition and when said aliquot portions of molten lead are introduced, said lead will flow through said aperture so that the molded straps on either side of said aperture are interconnected.

* * * * *